INVENTOR.
LEONARD W. ATCHISON

HIS ATTORNEY

Aug. 2, 1960   L. W. ATCHISON   2,947,153
COMBINED THERMOSTAT AND DEFROST CONTROL
FOR AIR CONDITIONING APPARATUS
Filed July 24, 1958   2 Sheets-Sheet 2

INVENTOR.
LEONARD W. ATCHISON
BY
HIS ATTORNEY

United States Patent Office 2,947,153
Patented Aug. 2, 1960

2,947,153

COMBINED THERMOSTAT AND DEFROST CONTROL FOR AIR CONDITIONING APPARATUS

Leonard W. Atchison, Louisville, Ky., assignor to General Electric Company, a corporation of New York Filed July 24, 1958, Ser. No. 750,651

4 Claims. (Cl. 62—156)

The present invention relates to an arrangement in an air conditioning apparatus for utilizing the usual air temperature controlling means of the apparatus to provide automatic defrosting of the evaporator under conditions of frost build-up thereon in addition to the normal function for the temperature controlling means of regulating the temperature of the air within the room.

In air conditioning units for cooling the air within an enclosure, the refrigeration systems of the units are frequently operated to cool the evaporator or cooling unit below the freezing point of water. Warm air from the enclosure, being circulated over the evaporator, normally contains a great deal of moisture which condenses out and sometimes forms a substantial coating of frost on the surfaces of the evaporator. This frost accumulation greatly decreases the rate of heat transfer between the air and the evaporator as well as restricting the flow of air through the evaporator and this, of course, greatly decreases the effectiveness of the air conditioning unit. To increase the efficiency of the unit, it is necessary to provide automatic defrosting of the evaporator. However, since the amount of frost build-up on the evaporator is not entirely dependent on the period of operation of the unit, but is more dependent upon the amount of moisture in the air and the other conditions under which the unit is operated, it is not practical to defrost the evaporator periodically after equal periods of operation. It is more efficient to perform the defrosting operation only after there has been a substantial frost build-up on the evaporator which may occur as often as once an hour or might not occur for days, depending upon the conditions of operation.

The present invention is based on the discovery of the fact that by properly arranging the components of the temperature control means which is presently provided on many of the air conditioning units now on the market, especially those air conditioning units of the self-contained type normally used to cool a specific zone, it is possible to utilize this temperature control means to attain automatic defrosting of the unit as well as temperature regulation of the air within the room.

Accordingly, it is an object of the present invention to provide an arrangement wherein the temperature controlling means of the air conditioning unit provides automatic defrosting of the evaporator of the unit as well as temperature regulation of the air within the enclosure.

It is another object of the present invention to provide an arrangement for an air conditioning unit in which the temperature responsive element of the temperature control means is so disposed with respect to the evaporator of the unit as to sense not only the temperature of the air entering the unit but also the temperature conditions resulting from decreased flow of air into the unit caused by frost build-up on the evaporator.

Further objects and advantages of the invention will become apparent as the following description proceeds and the features of novelty which characterize the invention will be pointed out with particularity in the claims annexed to and forming a part of this specification.

In carrying out the objects of the present invention, an air conditioner is provided having a refrigeration system with an evaporator, a compressor and a condenser arranged in refrigerant flow relationship. Means are provided within the unit for circulating a stream of air over the evaporator which is sometimes operated below the freezing point of water and causes frost to be collected on the surfaces thereof. A temperature control means is provided within the unit for energizing the refrigeration system when the air stream entering the evaporator from the enclosure is above a predetermined temperature and for de-energizing the refrigeration system when the air stream entering the evaporator from the enclosure is below a predetermined temperature. In order to attain automatic defrosting of the evaporator whenever there is a substantial frost build-up thereon, as well as the above-mentioned temperature regulation feature, the temperature sensing element of the temperature control means is disposed adjacent the evaporator on the upstream side thereof and directly in the air stream being circulated through the evaporator. The temperature sensing element is so disposed in relation to the evaporator that the element senses the temperature of the air stream entering the evaporator during normal air flow through the evaporator and, under conditions of frost build-up on the evaporator which cause a restriction of the air flowing through the evaporator, the element senses temperature conditions which are below the predetermined temperature for de-energizing the refrigeration system thereby causing the system to shut down and permitting the evaporator to become warm.

For a better understanding of the invention, reference may be had to the accompanying drawings in which.

Figure 1:
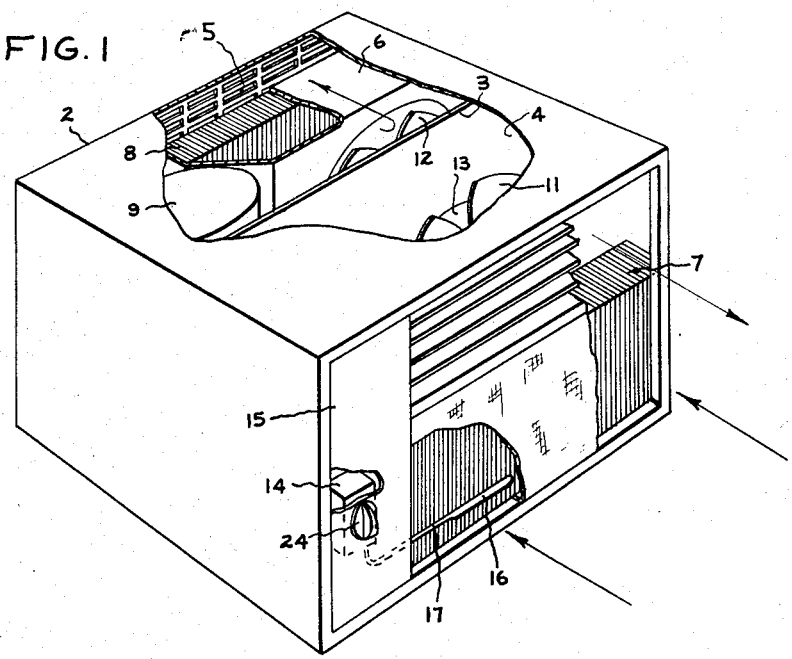
Fig. 1 is a perspective view showing an air conditioning unit of the self-contained type having the air temperature and defrost control of the present invention.

Referring to Fig. 1, there is shown an air conditioning unit of the self-contained type adapted for mounting within a window or opening in the wall of an enclosure. The unit is enclosed within a casing 2 which, in the illustrated embodiment of the invention, is divided by a barrier 3 into a pair of separate compartments, hereinafter referred to as the inner or evaporator compartment 4 and the outer or condenser compartment 6. The unit is provided with a pair of heat exchangers 7 and 8 mounted respectively within the inner and outer compartments 4 and 6. The heat exchangers 7 and 8 are connected in refrigerant flow relationship by suitable tubing to a compressor 9 which is also disposed in the outer or condenser compartment 6.

In those types of air conditioning units normally utilized for cooling an enclosure, the heat exchanger 7 is operated as an evaporator to extract heat from the air circulated through the evaporator compartment 4 and the heat exchanger 7 from within the enclosure. The heat exchanger 8 is operated as a condenser and discharges heat taken up by the refrigerant flowing through the evaporator 7 to the outdoor air circulated through the compartment. Suitable means are provided, such as the capillary tube 10 (seen only in Fig. 2), for providing a pressure drop between the evaporator 7 and the condenser 8 to promote vaporization of the refrigerant flowing from the condenser 8 to the evaporator 7.

In order to circulate air streams through the inner and outer compartments 4 and 6 there are provided a pair of fans 11 and 12 mounted respectively within the inner and outer compartments and arranged to be driven by a motor 13 which may be mounted on the barrier 3 of the unit. The fan 12 in the outer compartment 6 circulates a stream of air from the outside through the outer compartment 6 where it extracts heat from the condenser 8. The air is discharged back to the outdoors through suitable outlet openings 5 in the casing leading to the outside from the outer compartment 6 of the unit. The fan 11 pulls a stream of air from within the enclosure through the heat exchanger or evaporator 7 into the inner compartment 4. This air is directed rearwardly against the barrier 3 and diverted upwardly along the barrier to be discharged back into the enclosure again through the upper portions of the unit, as indicated by the arrows in Fig. 1. Suitable ducting is provided within the casing 2 to promote the flow of the air into and out of the respective compartments.

As thus far described, the air conditioner with its two separate compartments and its two separate heat exchangers form no part of the present invention but is intended only to be illustrative of the type of air conditioner to which the invention may be adapted. As will now be explained the invention deals with an arrangement for utilizing the regular temperature control means to provide defrosting of the evaporator whenever there is a sufficient frost accumulation thereon in addition to providing regulation of the temperature of the air within the room.

Many of the air conditioning units of the self-contained type now on the market provide a temperature control means or thermostat control for controlling the operation of the refrigeration system to maintain the temperature within the room within desirable limits. In the illustrated embodiment of the invention, a temperature control means or thermostat 14, of a type well known on the market for sensing the temperature of air, is provided on the control panel 15 on the front of the air conditioning unit. The thermostat 14 is adjustable over a wide range to permit the occupants of the room to select a satisfactory temperature for the air within the room. As may be seen in Fig. 2, the temperature control means includes a temperature responsive element or bulb 16 disposed closely adjacent the evaporator 7 and arranged to lie directly in the air stream flowing into the unit from the room or enclosure so that the bulb 16 senses temperature conditions in a manner to be hereinafter explained. The bulb is connected by means of tubing 17 to a conventional fluid type responsive member or bellows 18 and forms with these components a conventional fluid type thermostat. The bulb 16, tubing 17 and bellows 18 together provide a closed chamber for an expansible liquid or vapor. As is well understood, the pressure within the bellows member 18 is a function of the temperature of the bulb 16 and this pressure causes the bellows 18 to operate a switch 19, which includes a movable contact 21 and an adjustable contact 22, at some predetermined temperature condition for the bulb 16.

Figure 2:
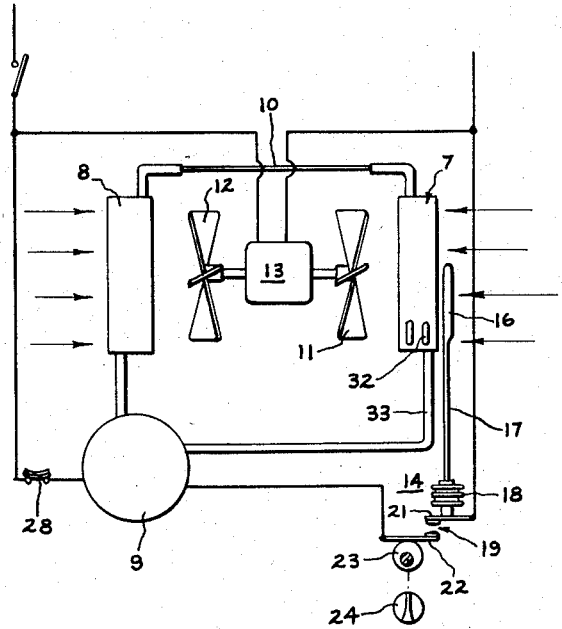
Fig. 2 is a diagrammatical view illustrating the manner in which the temperature and frost control of the present invention interrupts the power to the compressor whenever there is a lowered air temperature entering the unit or whenever there is a frost build-up on the evaporator of the unit.

Still referring to Fig. 2, it can be seen that the bellows 18 imparts a movement to the movable contact 21 to make or break contact with the second or adjustable contact 22 to either complete or interrupt the power circuit leading to the compressor 9. Contact 22 is made adjustable within certain limits by means of a cam 23, or by other means well known in the art for adjusting one of the contacts of a thermostat. The cam 23 is operated by means of a manual adjustment knob 24 extending through the front of the control panel 15 to permit adjustment of the temperature at which the switch 19 energizes or de-energizes the refrigeration system.

Figure 3:
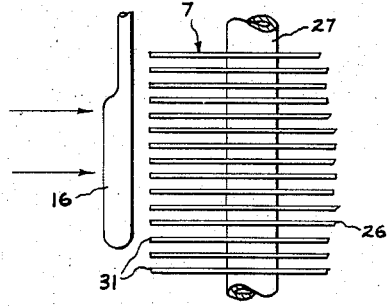
Fig. 3 is a detailed view of a portion of the evaporator of the room air conditioner showing the arrangement of the temperature responsive element.
Figure 4:
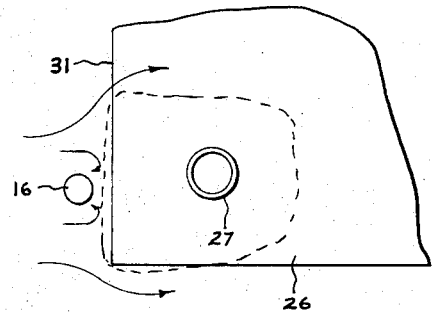
Fig. 4 is a partial side view showing the evaporator of Fig. 3.

The manner in which the temperature control means provides both the regulation of the temperature of the air within the room and the defrosting of the evaporator will be more clearly understood by reference to the detailed drawings of Figs. 3 and 4. In Fig. 3 there is shown a plurality of fins 26 of the evaporator 7 through which refrigerant carrying coils or tubes 27 (only one of which is shown) are arranged in the normal manner for cooling the fins or secondary surfaces of the evaporator. Air is circulated through the evaporator 7 from the left to right, as illustrated by the arrows in Fig. 3. The temperature responsive bulb 16 is arranged adjacent the fins 21 and disposed parallel to the evaporator 7. In this embodiment of the invention, the bulb 16 is not touching the evaporator fin surface and is disposed upstream from the evaporator directly in the air stream flowing through the evaporator. It has been discovered that, by placing the temperature sensing element directly in the air stream and closely adjacent the evaporator, when there is very little or no frost on the evaporator the bulb responds to temperature conditions which are controlled almost entirely by the temperature of the air stream. However, during frost conditions on the evaporator, the temperature conditions sensed by the bulb are controlled to a much greater extent by the temperature of the evaporator itself and to a much lesser extent by the air stream. During normal air flow through the evaporator the warm air flowing from left to right (as seen in Fig. 3) passes first over the temperature responsive bulb 16 and then enters the evaporator. This air flow prevents the cold temperatures of the evaporator from reaching or materially affecting the temperature of the bulb. Thus, the temperature sensed by the bulb 16 is near the temperature of the incoming air. Therefore, under normal conditions of air flow, the temperature responsive element 16 senses the temperature of the air entering the unit and, if this temperature is above the predetermined temperature, such as 72° as may be provided by adjustment of the contact 22 in the manner previously explained, the bellows 18 will move the switch 19 to the closed position thereby energizing the refrigeration system. However, if the air temperature goes below the predetermined temperature, such as the previously mentioned 72°, then the air temperature sensed by the bulb 16 will be sufficiently low to cause the bellows 18 to move the contact 21 away from the contact 22 and thereby open the swtich 19 to de-energize the compressor or the refrigeration system.

Referring now to Fig. 4, whenever there is an accumulation of frost on the fins 26 of the evaporator 7, there is a certain amount of restriction between these fins which reduces the flow of air through this particular portion of the evaporator 7. This normally occurs first at some coldest portion of the evaporator which is a characteristic of the particular design, and is usually near the outlet to the compressor. However, frost build-up can occur at almost any place on the evaporator and will, under normal conditions of operation, build-up on nearly all of the surfaces of the evaporator if the refrigeration system is operated for a sufficient period. As indicated by the dotted lines in Fig. 4, the frost build-up soon accumulates outwardly from the coils or tubing 27 and restricts the passage for air flow through the evaporator. This causes the air to be diverted, to a certain extent, away from the temperature sensing bulb 16 and creates eddy currents and a certain amount of reverse flow of the air adjacent the evaporator, as shown by the arrows in Fig. 4. Because of this diverting of the air flow away from the immediate area surrounding the bulb and a combination of other factors, such as the previously mentioned reversed flow of air which has been previously cooled by contact with the evaporator surface and the change in temperature of the upstream edges of the fins 26 due to the frost build-up adjacent these edges, the warm room air is no longer the controlling factor on the temperature of the bulb 16. Instead, the temperature conditions surrounding the bulb area, are to a much greater extent, controlled by the temperature of the evaporator. The bulb 16 then, of course, senses these lowered temperature conditions and when they drop below the predetermined temperature (72°) set for the thermostat 14, the bellows 18 opens the switch 19 and de-energizes the refrigerator system. Therefore, regardless of the temperature of the air entering the evaporator 7 or entering between the surfaces of fins 26, whenever there is a sufficient frost build-up to result in a predetermined restriction of air flow through the evaporator, the reduced temperature conditions in front of, or closely adjacent the upstream edges of, the evaporator causes the bulb 16 to de-energize the compressor.

In most refrigeration systems, there is provided an overload protector which prevents the compressor 9 from being energized whenever there is too great a load on the compressor. In the schematic diagram of Fig. 2, there is shown an overload protector 28 which may comprise any of the well known motor overload protectors now on the market, such as a current or heater operated protector which interrupts the power supply to the compressor whenever there is too great a current flowing through the windings of the compressor motor or too much heat generated by these windings due to the increased current flow therethrough caused by the heavy load or torque requirements necessary to start the compressor. Therefore, after the compressor of the refrigeration system has once been de-energized for defrost purposes, it will not start again immediately thereafter because the difference in pressure between the two sides of the system is too great causing too great a load on the compressor. That is, after the defrost cycle has once been started, even though the temperature sensing bulb 16 senses a condition above the predetermined temperature for energizing the refrigeration system, the system will not again be energized until pressures within the system have been approximately equalized. Under normal conditions, it will take the system anywhere from 2 or 3 minutes to equalize the pressure conditions such that the compressor can again be energized without tripping the overload protector. During this time, since the fan motor 13 continues to operate, warm air from the room is continually blown over the evaporator 7 and aids the rapid defrosting of this component.

Figure 5:
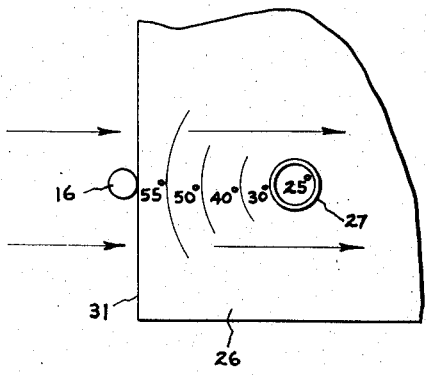
Fig. 5 is an enlarged detail view showing the increase in the temperature of the fin surface disposed upstream from the refrigerant carrying tubing.
Figure 6:
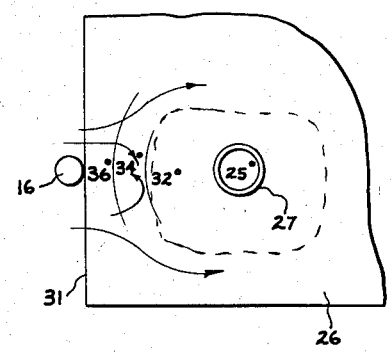
Fig. 6 is a view similar to Fig. 5 showing the effect of frost build-up on the surface of the fins.

It has been found in a tested embodiment of the invention that the bulb 16 can actually have portions of its surface touching the upstream edges 31 of the evaporator fins 26. Since the warm air entering the evaporator warms the upstream edges 31 of the fins and because the area of contact between the fins and the bulb is relatively small, the heat transfer by contact is relatively slight and the air stream still remains the major factor in the control of the temperature of the bulb. Referring to Fig. 5, it can be seen when there is refrigerant flowing through the coils, the tubes 27 assume a temperature of anywhere from 40° F. down to 20° F. depending upon the particular design characteristics of the system. However, the forward or upstream edges of the fins 26 are warmed by the air entering the evaporator and are maintained substantially above the temperature of the tubes 27. Thus, in the illustrated embodiment of Fig. 5, with the temperature of the tubes at 25° F., the temperature of the upstream edges 31 of the fins is maintained at 55° F. Of course, the temperature of the edge 31 of the fins is dependent upon the temperature of the air stream, its velocity, the distance between the edge of the fin and the tube, and other design factors. However, it is substantially higher than the temperature of the tubes and, so long as the air flow through the evaporator is not restricted, the temperature sensed by the bulb 16, for all practical purposes, is that of the air stream. However, as shown in Fig. 6, whenever there is a frost build-up in the area adjacent the tubing 27, the air flow through this portion of the evaporator is restricted and the temperature of the upstream edges 31 of the fins is quickly reduced. The frost accumulation (shown in dotted lines in Fig. 6), which builds-up around the tube 22, causes part of the air stream entering the evaporator to be diverted further and further away from the tube. Also a certain amount of air, after being cooled by contact with the fin surfaces, is directed back toward the forward or upstream edges 31 of the fins. This air causes the forward portions of the fins as well as the area surrounding the bulb 16 to become much colder than under normal conditions of air flow and, when the temperature sensed by the bulb 16 drops below the predetermined temperature (such as the previously mentioned 72° F.) for actuating the switch 19, the bulb 16 initiates the defrost cycle.

It should be noted that bulb 16 does not actually have to be touched by the frost build-up on the evaporator surfaces or fins 26 before it senses a temperature condition which is below the predetermined temperature for de-energizing the refrigeration system. After a certain build-up of frost within the evaporator 7, direct radiation from the evaporator, eddy currents, and reversed air flow in the frost accumulation area causes the temperature just in front of the evaporator to drop very quickly. However, by adjusting the position of the bulb 16, within certain limits, it is possible to permit almost any desirable degree of frost build-up on the evaporator prior to initiation of the defrost cycle. That is, by adjusting the distance that the surface of the bulb is disposed away from the evaportor fins it is possible to obtain a frost build-up that almost touches the bulb 16 before the bulb senses a low enough temperature to initiate the defrost cycle, and conversely, by properly positioning the bulb close enough to the fins, i.e., with portions of the bulb surface touching the fins, the frost accumulation can be kept to a minimum with the defrost cycle being initiated at almost the first appearance of frost accumulation on the surfaces of the evaporator. Through proper adjustment of the position of the bulb 16 within certain limits, it is possible to attain defrost control at almost any degree of frost build-up.

It has been found in a tested embodiment of the invention that it is not usually desirable to move the outer surface of the bulb more than ¼ of an inch away from the surface of the evaporator. That is, adjustment of the position of the bulb should usually be made between the position where it touches the fins to a distance of ¼ of an inch away from the fins. When too much of the bulb surface is further than ¼ of an inch away from said evaporator fins, it has been found that the frost build-up sometimes becomes too great before the frost cycle is initiated. This frost restricts the air flow through the evaporator during the defrost period and greatly increases the period needed for defrosting the evaporator. Also, when the bulb is placed too far upstream from the upstream surface of the evaporator, it is no longer influenced to such an extent, nor as quickly, by the temperature of the evaporator and continually senses the temperature of the air stream until there is a sufficient frost build-up on the evaporator to almost touch the bulb surface.

It is well known in the art that certain portions of the evaporator are maintained at colder temperatures than others. For instance, the temperature of the evaporator coils or tubes near the outlet to the compressor are frequently colder than the coils elsewhere in the evaporator. Referring to Fig. 2, the coils or tubes 32 which discharge refrigerant into the outlet to the suction line 33 and the area adjacent these coils, are in some instances the coldest portions of the evaporator 7. Since the frost build-up normally occurs in the areas surrounding the coldest coils of the evaporator, in the preferred embodiment of the invention, it is desirable to position the bulb 16 directly upstream from the coldest portion of the evaporator. More specifically, in the preferred embodiment of the invention it is desirable to position the bulb 16 directly upstream from the evaporator coils near the discharge outlet to the suction line 33 to the compressor 9 or directly upstream from the area which is the coldest portion of the evaporator and upon which the frost build-up is likely to occur first. However, it should be pointed out that the coldest portion of the evaporator can under certain conditions of operation be in an area other than that directly adjacent the suction outlet to the compressor. Also, the sensing element can be positioned at almost any point adjacent the evaporator, in the air stream entering the evaporator from the enclosure, and the element 16 will initiate defrosting whenever there is a frost build-up on that portion of the evaporator directly downstream from thermal sensing element.

By the present invention there has been provided an arrangement whereby the temperature control means for controlling the temperature of the air entering the unit from the enclosure is also untilized to automatically initiate a defrost cycle whenever there is a sufficient build-up of frost on the evaporator. Moreover, this arrangement permits minor adjustments to be made in the position of the thermal sensing element of the temperature control means to allow varying degrees of frost build-up on the evaporator for operating the refrigeration system under the most expedient conditions of operation.

While in accordance with the Patent Statutes there has been described what at present is considered to be the preferred embodiment of the invention, it will be understood by those skilled in the art that various changes and modifications may be made therein without departing from the invention, and it is therefore, the aim of the appended claims to cover all such changes and modifications as fall within the true spirit and scope of the invention.

What I claim as new and desire to secure by Letters Patent of the United States is:

1. An air conditioning apparatus for cooling the air within an enclosure comprising a refrigeration system including an evaporator, a compressor and a condenser connected in refrigerant flow relationship, means for continuously circulating a stream of air from within said enclosure through said evaporator and back into said enclosure, means for operating said system to cool said evaporator below the freezing point of water whereby frost tends to collect on the surface of said evaporator, a temperature control means for energizing said refrigeration system when the air stream entering said evaporator from said enclosure is above a predetermined temperature and de-energizing said refrigeration system when the air stream entering said evaporator from said enclosure is below said predetermined temperature, said temperature control means also de-energizing said system to defrost said evaporator when frost accumulates on said evaporator, said temperature control means including a single temperature sensing element disposed adjacent said evaporator on the upstream side thereof and directly in the air stream being circulated through said evaporator, said temperature sensing element being so disposed with relation to said evaporator that said element senses the temperature of said air stream entering said evaporator during normal air flow through said evaporator and senses temperature conditions below said predetermined temperature for de-energizing said refrigeration system during restricted air flow through said evaporator due to frost accumulation thereon.

2. An air conditioning apparatus for cooling the air within the enclosure comprising a refrigeration system including an evaporator, a compressor and a condenser connected in refrigerant flow relationship, means for continuously circulating a stream of air from within said enclosure through said evaporator and back into said enclosure, means for operating said system to cool said evaporator below the freezing point of water whereby frost tends to collect on the surface of said evaporator, a temperature control means for energizing said refrigeration system when the air stream entering said evaporator from said enclosure is above a predetermined temperature and for deenergizing said refrigeration system when the air stream entering said evaporator from said enclosure is below said predetermined temperature, said temperature control means also de-energizing said system to defrost said evaporator when frost accumulates on said evaporator, said temperature control means including a single temperature responsive element disposed adjacent said evaporator on the upstream side thereof and directly in the air stream flowing through said evaporator, said temperature responsive element being disposed not more than ¼ of an inch away from said evaporator on the upstream side thereof so that said temperature sensing element senses the temperature of said air stream entering said evaporator during normal air flow through said evaporator and senses temperature conditions below said predetermined temperature for de-energizing said refrigeration system during restricted air flow through said evaporator due to frost accumulation thereon.

3. An air conditioning apparatus for cooling the air within an enclosure, comprising a refrigeration system including an evaporator, a compressor and a condenser connected in refrigerant flow relationship, means for continuously circulating a stream of air from within said enclosure through said evaporator and back into said enclosure, said evaporator being connected by a refrigerant gas suction tube to said compressor, said frost build-up first occurring on the portions of said evaporator near to the suction tube outlet to said compressor, a temperature control means for energizing said refrigeration system when the air stream entering said evaporator from said enclosure is above a predetermined temperature and for de-energizing said refrigeration system when the air stream entering said evaporator from said enclosure is below said predetermined temperature, said temperature control means also de-energizing said system to defrost said evaporator when frost accumulates on said evaporator, said temperature control means including a single temperature sensing element disposed not more than ¼ of an inch away from the upstream side of said portion of said evaporator nearest to said suction tube outlet to said compressor and in said air stream entering said evaporator from said enclosure so that said temperature sensing element senses the temperature of said air stream entering said evaporator during normal air flow through said evaporator and senses temperature conditions below said predetermined temperature for de-energizing said refrigeration system during restricted air flow through said evaporator due to frost accumulation thereon.

4. An air conditioning apparatus for cooling the air within an enclosure comprising a refrigeration system including an evaporator, a compressor and a condenser connected in refrigerant flow relationship, said evaporator having a suction outlet connecting with a refrigerant gas suction tube to said compressor, means for continuously circulating a stream of air from within said enclosure through said evaporator and back into said enclosure, means for operating said system to cool said evaporator below the freezing point of water whereby frost tends to build-up on the surface of said evaporator, said frost build-up occurring first on the portions of said evaporator nearest said suction outlet to said compressor, an expansible fluid operated thermostat for energizing said refrigeration system when said air stream entering said evaporator from said enclosure is above a predetermined temperature and for de-energizing said refrigeration system when the air stream entering said evaporator from said enclosure is below said predetermined temperature, said thermostat including a longitudinal bulb filled with an expansible fluid, a portion of said bulb being disposed parallel to and having its surface not more than ¼ of an inch away from the upstream side of said evaporator, said bulb also being positioned directly upstream from that portion of said evaporator closest to said suction outlet to said compressor, said bulb also being disposed directly in the air stream entering said evaporator so that said bulb element senses the temperature of said air stream entering said evaporator during normal air flow through said evaporator and senses temperature conditions below said predetermined temperature for de-energizing said refrigeration system during restricted air flow through said evaporator due to frost accumulation thereon.

References Cited in the file of this patent

UNITED STATES PATENTS

| | | |
|---|---|---|
| 1,704,352 | Thomson | Mar. 5, 1929 |
| 2,117,104 | Rorison | May 10, 1938 |
| 2,193,836 | Winther | Mar. 19, 1940 |
| 2,400,334 | Berry | June 29, 1944 |
| 2,759,333 | Atchison | Aug. 21, 1956 |
| 2,774,220 | Heym | Dec. 18, 1956 |
| 2,917,905 | McGrath | Dec. 22, 1959 |